Jan. 12, 1960　　　G. F. C. BURKE ET AL　　　2,920,744
AUTOMATIC CONVEYOR SYSTEMS
Original Filed March 7, 1956　　　　　　　10 Sheets-Sheet 5
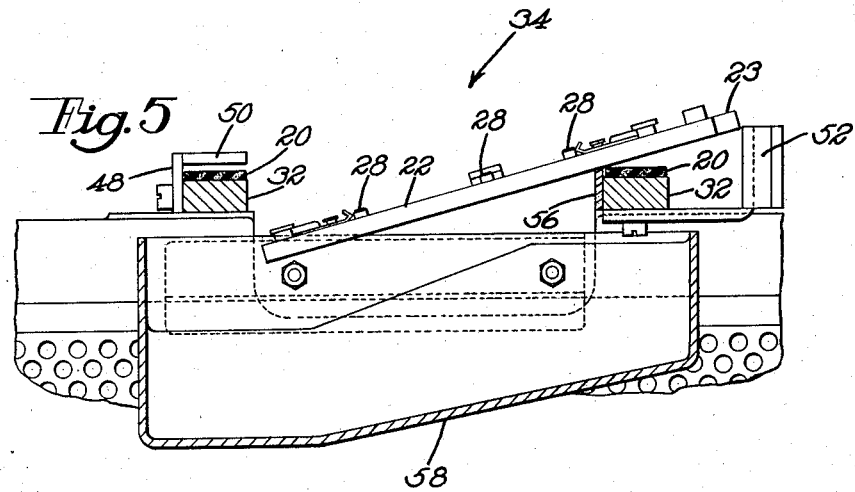
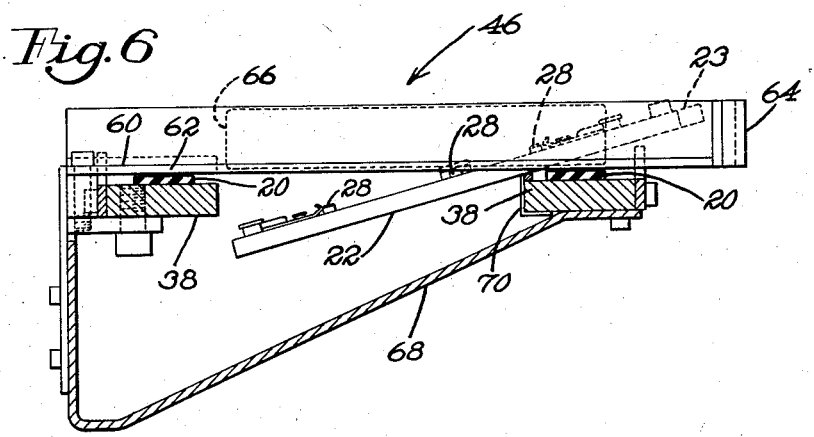
Inventors
George F.C. Burke
Robert F. Lane
By their Attorney

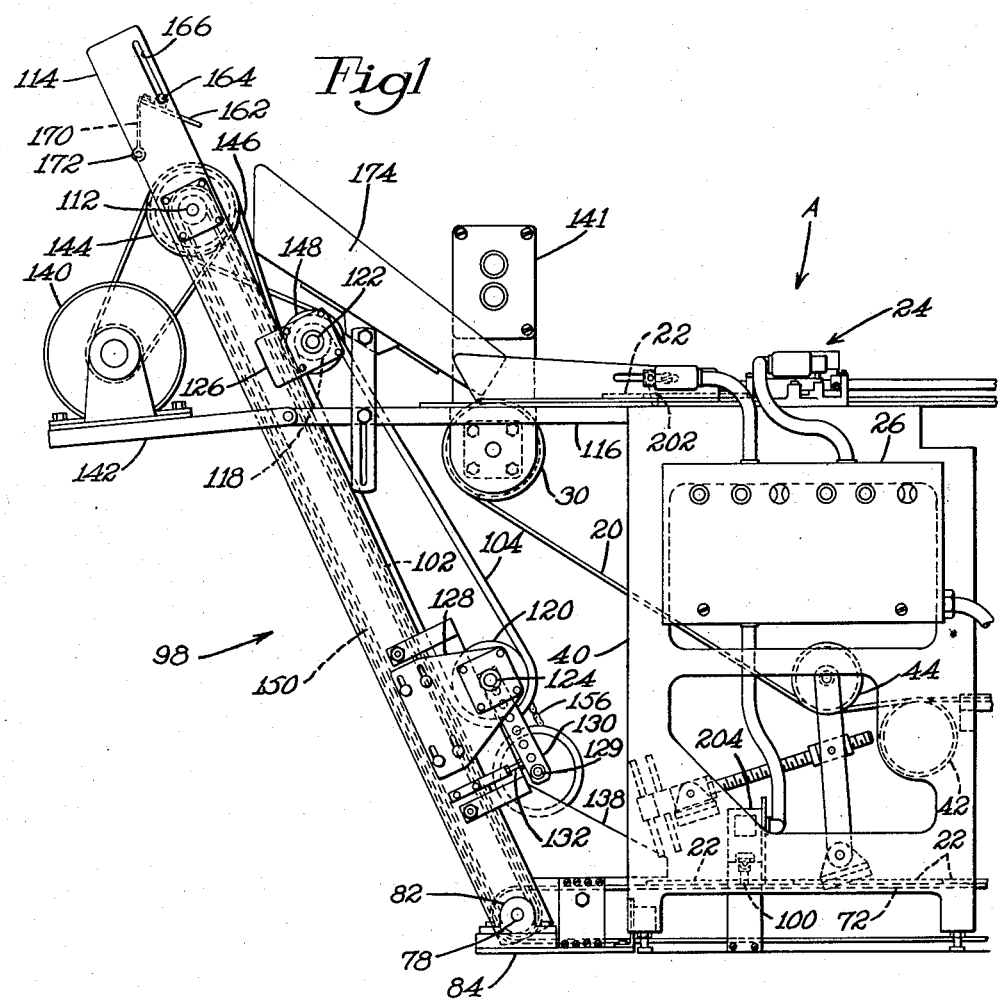

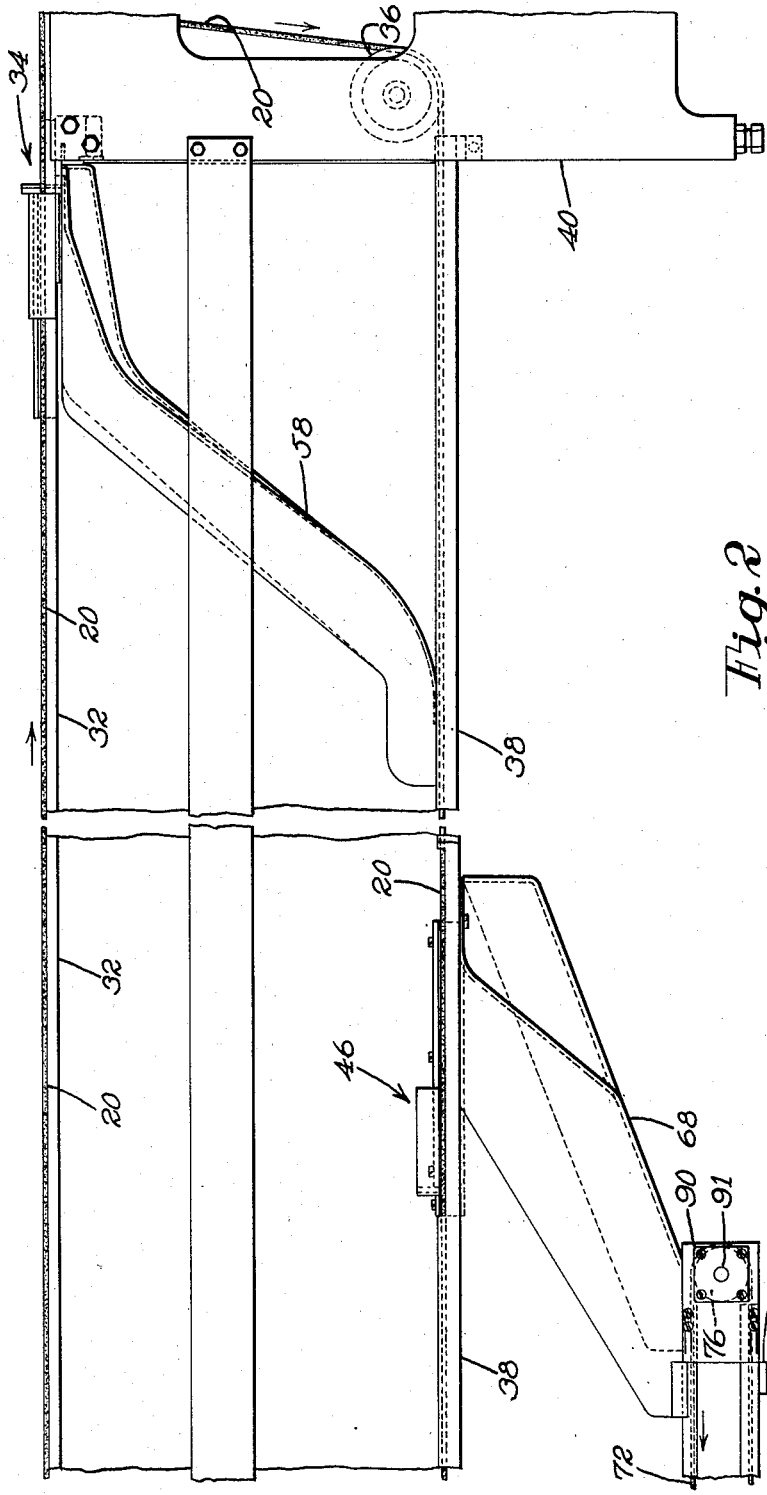

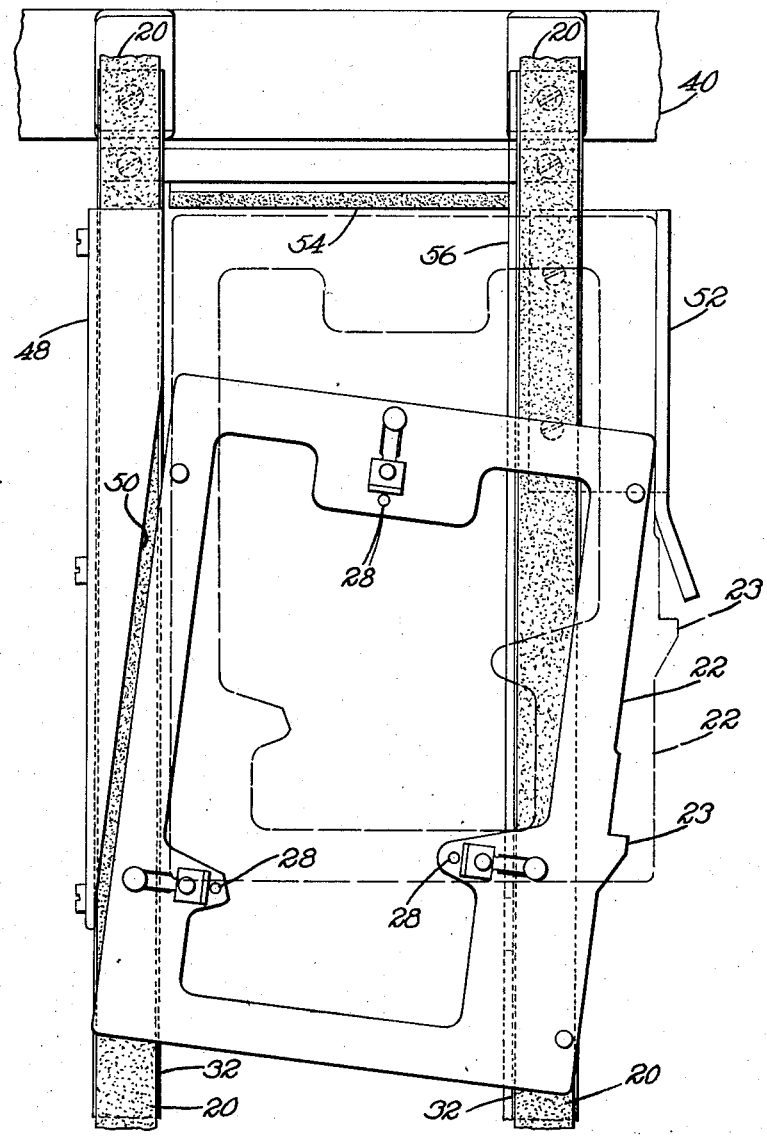

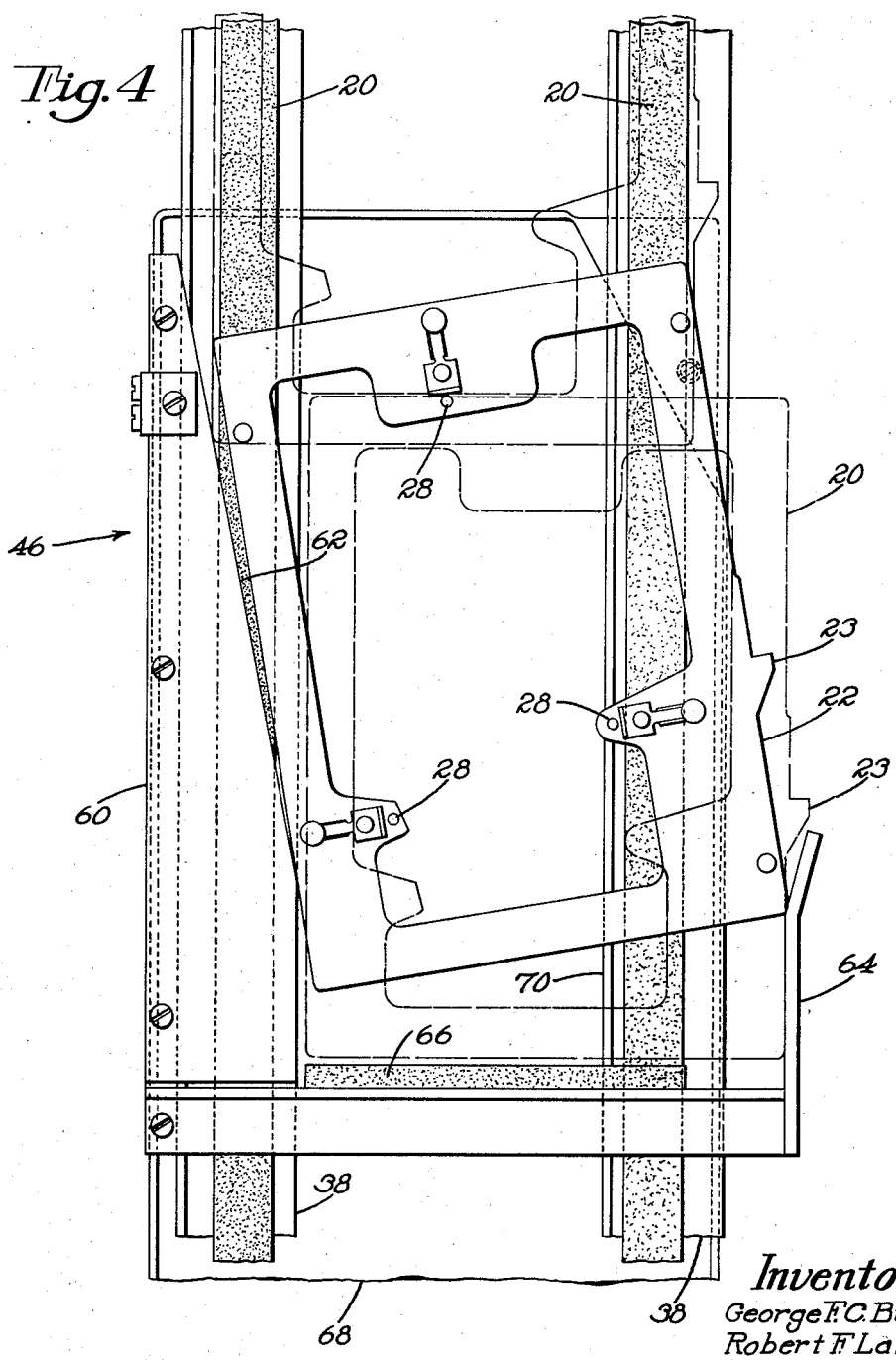

Inventors
George F.C. Burke
Robert F. Lane
By their Attorney

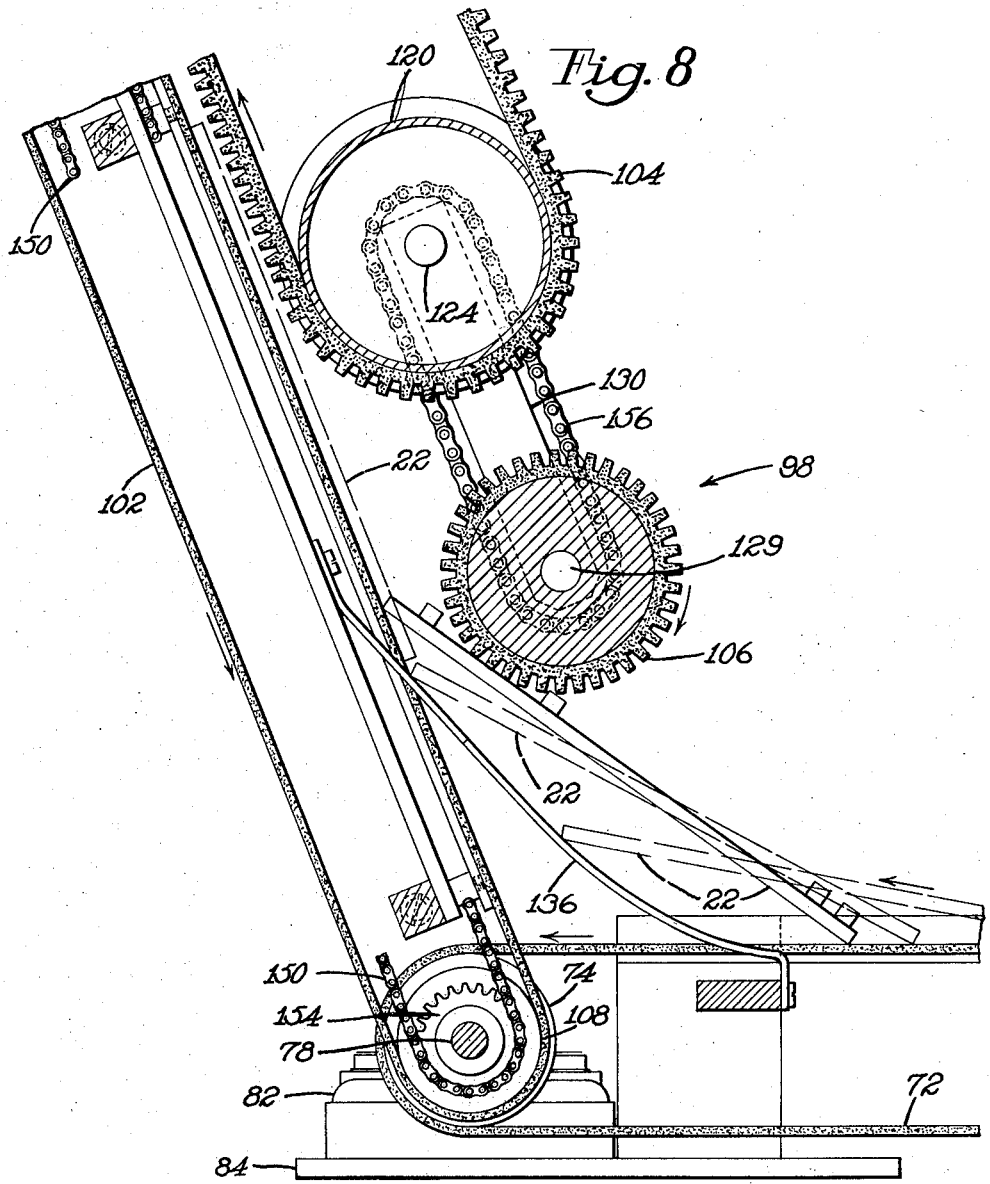

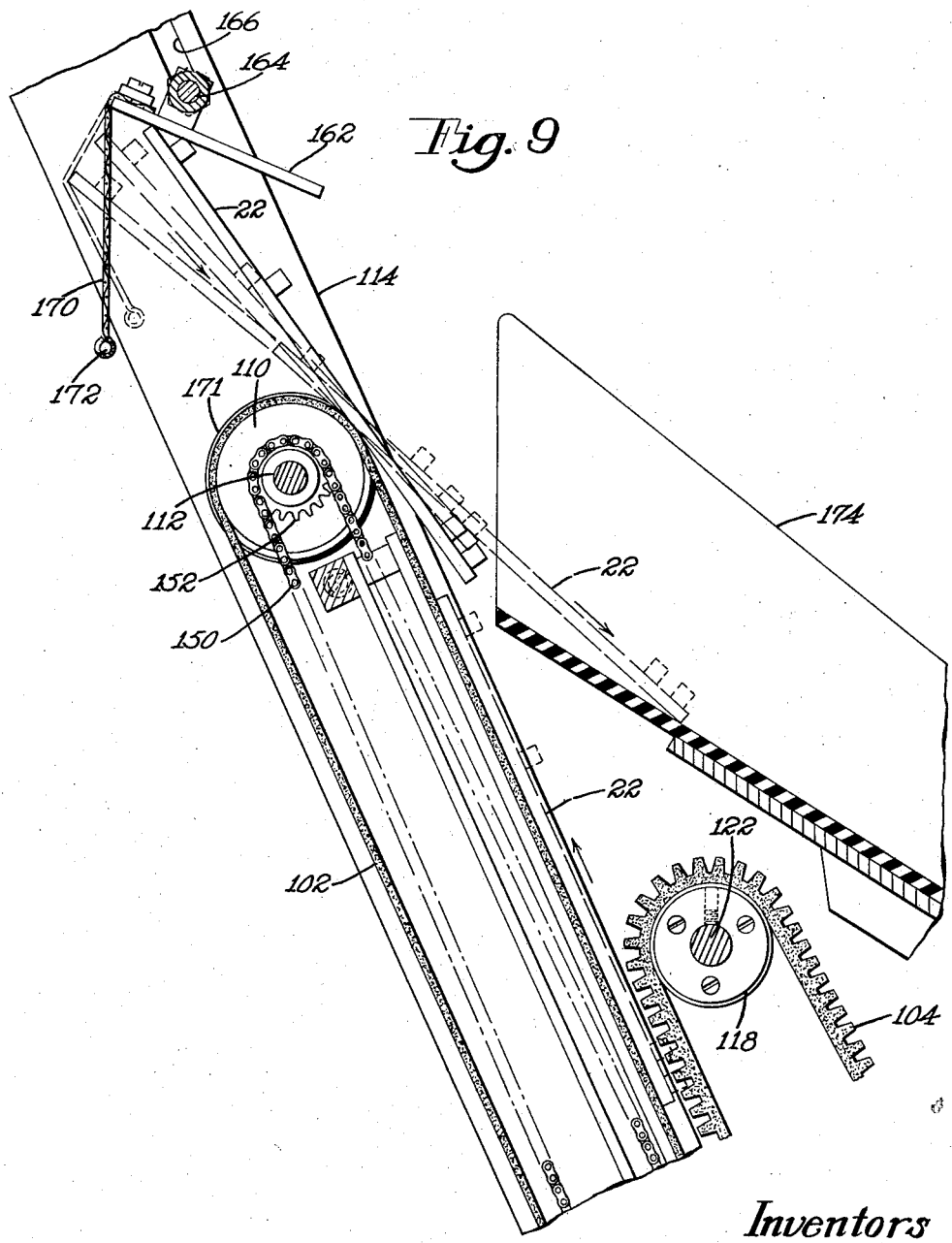

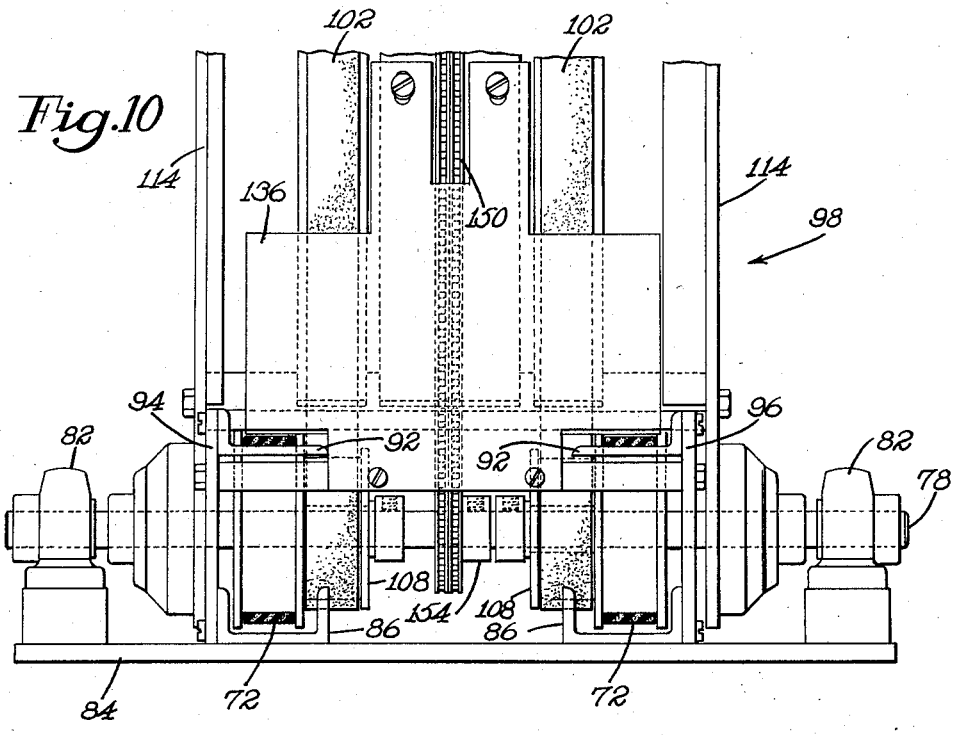
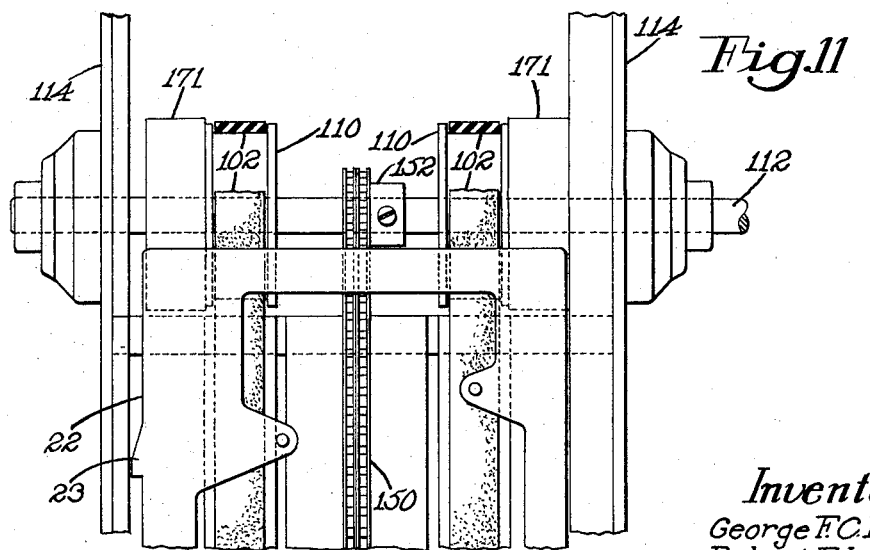

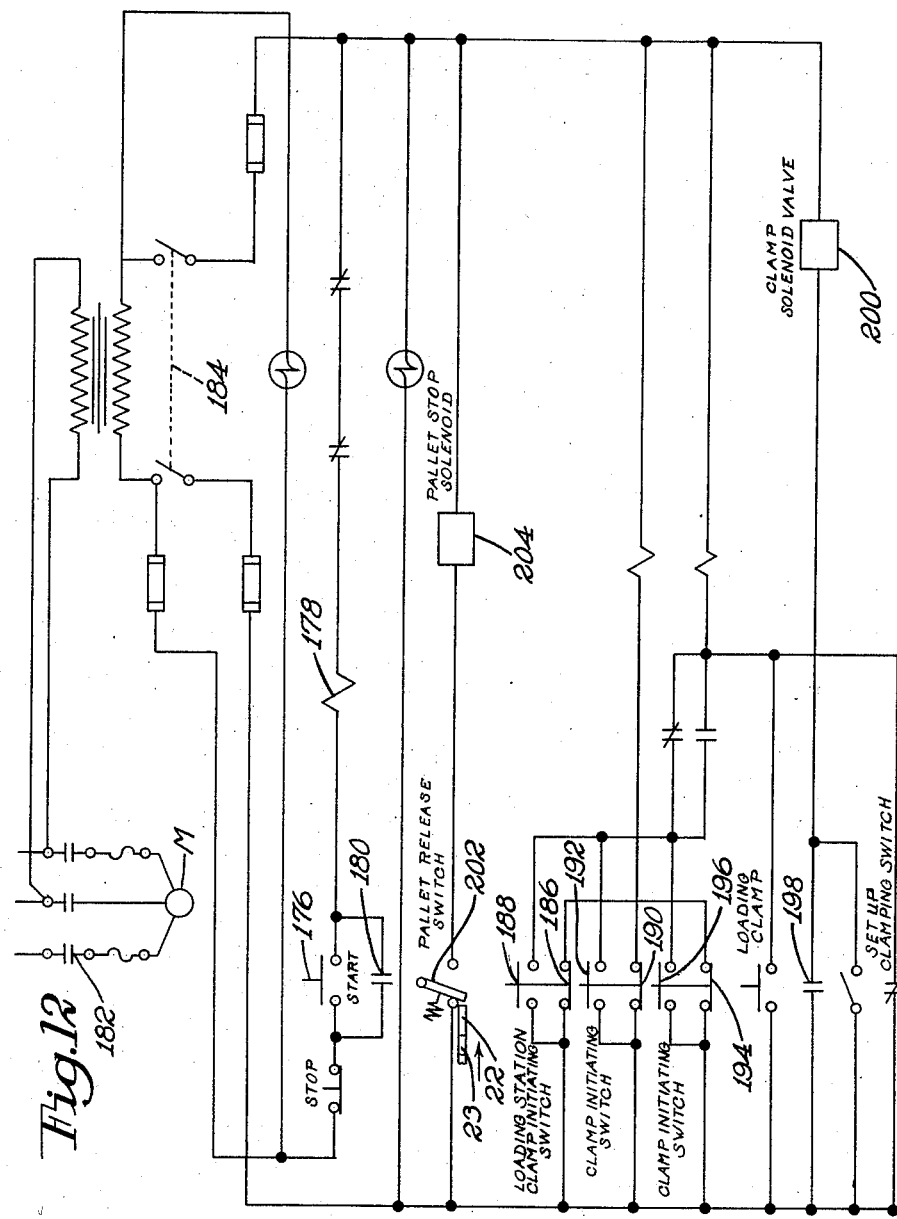

United States Patent Office 2,920,744
Patented Jan. 12, 1960

2,920,744

AUTOMATIC CONVEYOR SYSTEMS

George F. C. Burke and Robert F. Lane, Beverly, Mass., assignors to United Shoe Machinery Corporation, Boston, Mass., a corporation of New Jersey Continuation of application Serial No. 570,106, March 7, 1956. This application May 15, 1958, Serial No. 735,640

2 Claims. (Cl. 198—85)

This invention relates to mechanism for controlling the transfer of articles, especially non-flexible sheets or plate-like articles, which are to be consecutively recycled on a conveyor. More particularly, and as herein illustrated and described, the invention is concerned with providing a conveyor for carrying work holders with means for unloading the holders from the discharge end of the conveyor, and for returning and then reloading the empty work holders successively at its charging end. Although the invention is disclosed herein by way of example as associated with an endless belt type of continuously driven conveyor and affords means whereby flat, open, rectangular pallets for mounting chassis, such as printed wiring boards, may be recirculated in an automatic assembly line, it will be appreciated that application of the invention in its various aspects is not thus limited but may well have use in various conveyor systems of production and/or treatment outside of the electronics industry.

This application is a continuation of the copending application Serial No. 570,106, filed March 7, 1956 in the names of George F. C. Burke and Robert F. Lane, entitled "Automatic Conveyor Systems" (now abandoned).

Automatic production and treatment systems frequently employ an in-line arrangement for a series of operating stations and an endless belt type of conveyor for shifting successive work pieces from one station to the next. It is often desirable when a work piece has been transferred through all the stations in succession, that it should be brought back to the start of the line and again passed through one or more times. A similar situation exists when operations require or make desirable the repeated cycling of work holders which carry work pieces from one station to the next. Manually to return the work holders to a starting or other point on the same (or another) conveyor is burdensome, and it is likewise expensive to stock excessive and frequently idle work holders. It is accordingly a primary object of this invention to provide an in-line conveyor system with improved automatic means for recycling articles thereon or for merely transferring the articles to other conveyor means.

One feature of the invention resides in the provision of improved mechanism for loading onto the receiving end of a primary conveyor non-flexible, generally flat articles, which, for instance, may be empty work-holding pallets returned on a lower level, said loading mechanism comprising a pair of upwardly extending, endless auxiliary conveyors, one of which is superposed on the other to grip and elevate successive articles, a feeding device mounted yieldingly to engage each article ahead of said superposed conveyor and restrain the article for movement into the bite of the auxiliary conveyors, an inclined guideway extending from the vicinity of the upper end of one of the auxiliary conveyors to the receiving end of the primary conveyor, and a member disposed to be engaged by each article after it has been elevated by the auxiliary conveyors for deflecting it therefrom and enabling it to fall into said guideway.

The above and other features of the invention, including novel details of construction and arrangements of parts will now be described in greater particularity in connection with an illustrative apparatus in which the invention is embodied and with reference to the accompanying drawings thereof, in which:

Fig. 1 is a side elevation of the loading end of an automatic conveyor system exemplifying this invention;

Fig. 2 is a side elevation of an intermediate portion and the delivery end portion of the primary conveyor shown in Fig. 1;

Fig. 3 is an enlarged plan view of the upper pallet drop-off mechanism seen in Fig. 2, the skewed position of a pallet being shown in full lines and its subsequent position of imbalance being indicated by dash lines;

Fig. 4 is a view similar to Fig. 3 but showing the lower pallet drop-off mechanism shown in Fig. 2 and successive positions of a pallet which is then being conveyed toward the loading end of the conveyor, i.e., downwardly as seen in Fig. 4;

Fig. 5 is a view partly in end elevation and partly in vertical section of the parts shown in Fig. 3;

Fig. 6 is a view corresponding to Fig. 5 but showing the parts seen in Fig. 4;

Fig. 8 is a view corresponding to Fig. 7 with certain parts removed more clearly to illustrate feed roll mechanism and the progressive positions of a pallet being elevated for reloading;

Fig. 9 is an enlarged side elevation of the upper portion of the pallet reloading mechanism shown in Fig. 1, one position of a pallet being shown in full lines and its subsequent positions being shown in dash lines;

Fig. 10 is a view in elevation and looking to the left in Fig. 7;

Fig. 11 is a view in elevation and looking to the left in Fig. 9; and

Fig. 12 is a schematic wiring diagram showing the electrical control for the pallet return feed as applied to a main conveyor control system.

Figure 7:
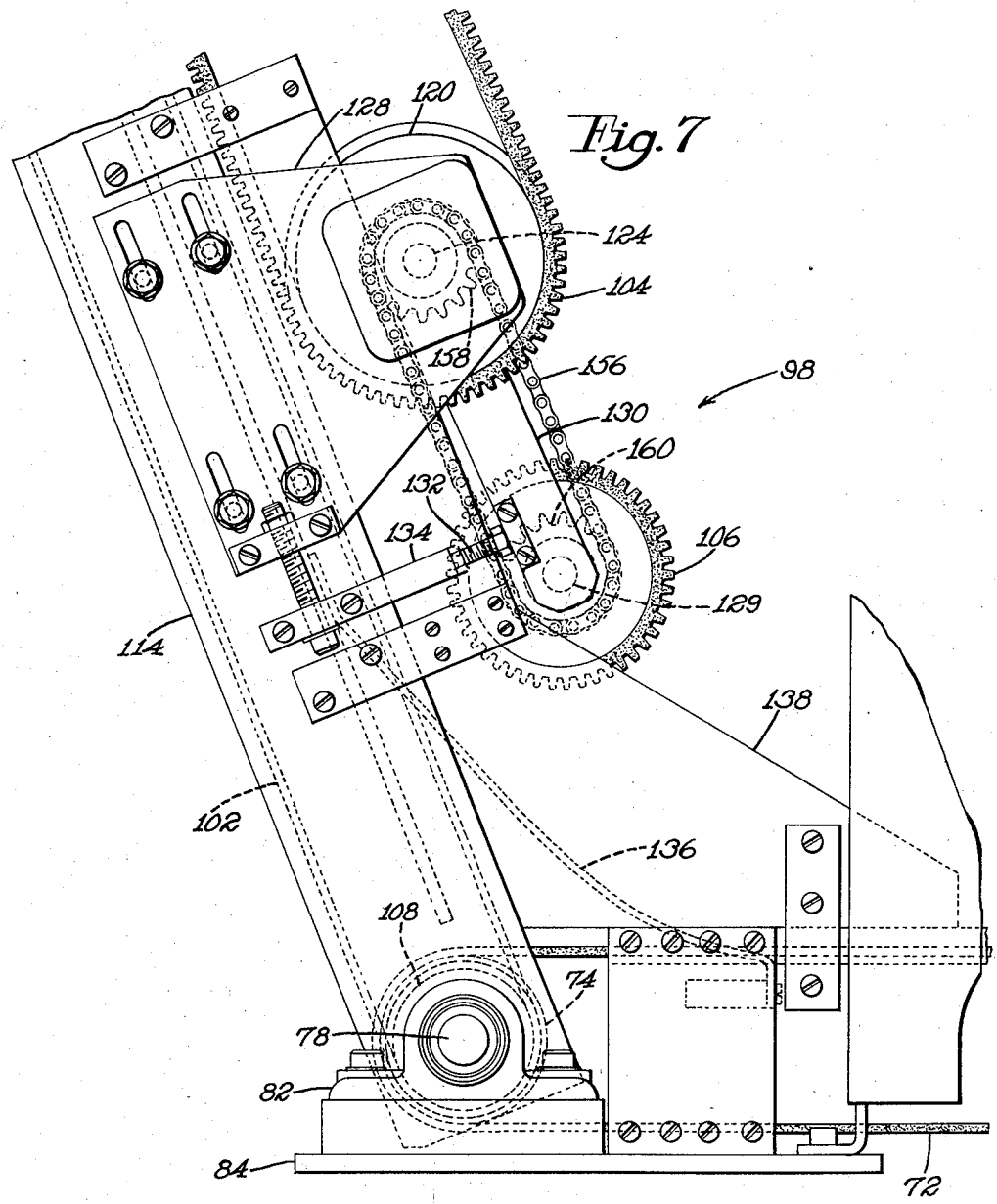
Fig. 7 is an enlarged side elevation of the lower portion of the pallet reloading mechanism shown in Fig. 1.

The main conveyor organization with which this invention, for purposes of illustration, is preferred to be shown and explained in novel combination, is for the most part similar to that disclosed in United States Letters Patent No. 2,772,416, granted December 4, 1956 in the names of Adolph S. Dorosz and Thomas W. Snow. As fully described therein, a pair of endless, parallel belts 20, 20 (Figs. 1 to 4 inclusive) is continuously driven to carry work holders in succession to and through a series of operating stations. The work holders are in the form of flat, open rectangular pallets 22 (Figs. 3 and 4) adapted detachably to carry, for instance, printed wiring boards (not herein shown) in fixed position thereon. The operating stations (not shown) are spaced along the upper reach of the belts 20, 20 so that, upon arriving at the discharge end, the wiring boards have very largely been assembled with their required electronic components, each successive board is separated from its pallet (for example, by board unloading mechanism of the type disclosed in a copending application, Serial No. 517,730, filed June 24, 1955, in the name of Daniel Walker Hannable), and the empty pallets 22 are then available to be recirculated through the production line or otherwise further employed. Each operating station, as fully explained in said Dorosz et al. patent, is associated with an adjacent electrical pallet lock-up and control mechanism of the type herein generally designated 24 and shown in Fig. 1. For present purposes it will suffice briefly to indicate the manner of operation of this mechanism. The arrangement is such that the several pallet lock-up and control mechanisms 24 can only be effective to actuate the stations when a pallet 22 has arrived at each station and triggered a switch thereat. For engaging an arm of the switch thus to trip it each pallet has a side projection 23 (Figs. 3, 4 and 11), it being apparent that any selected portion of an article being conveyed might be suitable for this purpose. Accordingly, the stations intermittently operate simultaneously, each pallet being temporarily disassociated from the belts 20 and locked at each successive station to have some work or treatment performed upon its wiring board. When the stations have acted upon the wiring boards the pallets are automatically returned to the belts 20 for travel to the next station. Over-all control of the main conveyor system may be exercised by means of switches mounted on a control box 26 (Fig. 1).

In the usual arrangement of the conveyor system heretofore, the initial operating station, in addition to having a pallet lock-up and control mechanism 24, has include a machine for mounting wiring boards on positioning pins 28, 28 of the respective pallets 22; for example, a board loading machine of the type disclosed in a copending application, Serial No. 510,963, filed May 25, 1955, in the name of Daniel Walker Hannable. As herein shown, there now is preferably provided ahead of the board loading station in the conveyor line an initial receiving or pallet metering station, designated "A" in Fig. 1, which is provided merely with a pallet lock-up and control mechanism 24, and associated electrical controls to be described, but no machine. By means of the novel pallet recirculating and loading mechanism hereinafter explained it will be seen that, after running through the series of stations and being unloaded, the pallets 22 may successively be recycled, the metering station "A" insuring that an empty pallet will be reintroduced to the assembly line each time a completed board assemblage is removed from the delivery end.

After the belts 20, 20 pass over a pulley 30 (Fig. 1) and through the metering station "A" and succeeding stations, being backed in their upper reach by spaced bars 32, 32, respectively, the belts travel over an upper pallet knock-off mechanism, generally designated 34 in Fig. 2, over a discharge end driving pulley (not shown) and a discharge end pulley 36, and over a lower reach in which they are backed by spaced bars 38, 38. The bars 32 and 38 are supported by portions of a sectional main conveyor frame 40 which also normally serves to support the various operating machines. Before returning over the surfaces of a pair of idler rolls 42, 44 (Fig. 1), the belts 20 in their lower reach traverse a lower pallet knock-off mechanism generally designated 46 (Fig. 2).

The upper and lower pallet knock-off mechanisms 34, 46, respectively, are similar in their construction and operation. Referring to Figs. 3 and 5, the upper knock-off means will now be described. A deflector 48 secured to the rear bar 32 has a cam surface 50 angularly disposed above the rear belt 20 and arranged to be engaged by an external edge face of an empty pallet being conveyed. This pallet is accordingly skewed with respect to the direction of travel of the belts and further carried primarily by the front belt 20 until, having been realined by engagement with a front guide 52, the leading edge of the pallet is caused to engage a resilient stop 54 (Fig. 3) secured between the bars 32. The pallet is then in generally parallel arrangement with the belts 20, 20, as indicated by the dash lines of Fig. 3, but its offset position is one of imbalance, as shown in Fig. 5, and the pallet is permitted to tilt and slide rearwardly over a rail 56 upstanding from the frame 40 at the rear sides of the front bar 32 and of the front belt 20. The rail 56 thus slows pallet travel in the direction of the belts and avoids the build up of pressure between the stop 54 and the pallet which otherwise might interfere with its free fall therefrom. The pallet is thus caused to fall between the belts 20 and into an inclined chute or guideway 58 (Figs. 2 and 5) which serves to conduct the pallet onto the lower return reach of the belts 20.

At a selected intermediate point along the return reach the successive empty and returning pallets arrive at the lower pallet knock-off mechanism 46 (Figs. 2 and 4) wherein a deflector 60, secured to the rear bar 38, has a cam surface 62 angularly disposed above a portion of the rear belt 20. Each pallet accordingly is again caused, upon engagement with the surface 62, to be skewed with respect to the line of travel of the belts, and a front guide 64 in cooperation with a resilient stop 66 (corresponding to the guide 52 and the stop 54) re-alines the pallet in a position of imbalance (shown by dash lines in Fig. 4), the pallet then tilting and sliding rearwardly to fall into an inclined chute 68. A rail 70 (corresponding to the rail 56), extending along the rear side of the front bar 38 and the adjacent belt 20, prevents the pallet from being dragged by the belt as it is being tilted by gravity and thus avoids its being dropped in a position out of parallelism with the belts. The chutes 58 and 68 are fixedly supported on the frame 40 as shown in Fig. 2.

After sliding down the chute 68 each pallet emerges to ride (to the left as seen in Fig. 2) upon the upper or load-carrying surface of an endless, horizontal floor conveyor comprising spaced, parallel belts 72, 72 (Figs. 1, 2, 7, and 10). It will be understood that where convenient and practicable this floor conveyor may be eliminated and the lower reach of the primary conveyor employed to transfer the returning work or work holders the entire distance to auxiliary hoisting mechanism hereinafter to be explained. The belts 72 are preferably of suitable length to serve as a reservoir and accommodate in end-to-end relation an accumulation of empty reserve pallets, and are mounted on pulleys 74, 74 (Figs. 7 and 10) and 76, 76 (Fig. 2). The main function of the floor conveyor is to accumulate all pallets in return movement when the machines at the stations on the main conveyor have their respective pallets locked up. The pulleys 74 are rotatable on a shaft 78 journaled in spaced bearing blocks 82, 82 secured on a floor plate 84. A pair of channel bars 86, 86 in which the belts 72 travel extend from the floor plate 84 to a floor plate 88 upon which bearing blocks 90 are secured rotatably to support a shaft 91 mounting the pulleys 76. The upper reach of the belts 72 is backed by a pair of angle irons 92, 92, respectively supported by means of brackets 94, 96 secured to the channel bars 86. Before coming to pallet-elevating means designated generally by reference character 98 and about to be described, each leading return pallet on the belts 72, 72 is stopped in its travel by engagement of its trigger projection 23 with a stop in the form of a solenoid plunger 100 (Figs. 1 and 12). This plunger is lifted by electrical control means hereinafter explained to allow a single pallet to escape or pass for reloading. In general the largest number of empty pallets that might be backed up end-to-end on the belts 72 behind the plunger 100 and waiting to be reloaded one by one will depend on the number of operating stations and the number of pallets discharged and in process of being recirculated.

The elevating means 98 (Figs. 1, 7, and 8) includes inclined, endless belts 102, 102, a resilient inclined endless belt 104 disposed to cooperate with an intermediate portion of the load-carrying surfaces of the belts 102, 102, and a pivotally suspended feed roll 106 engageable widthwise with the upper surface of successive pallets to be reloaded. The belts 102, 102 pass around lower pulleys 108, 108, respectively, which are secured on the shaft 78, and around upper pulleys 110, 110 (Fig. 11), repectively, which are mounted on a shaft 112. The latter is journaled in parallel side bars 114, 114. In addition to having their lower ends supported on the shaft 78 the bars 114 have an intermediate portion connected to a bracket 116 extending from the frame 40. The resilient belt 104 is preferably of serrated rubber composition, its alternate grooves and ridges extending widthwise. Though not apparent from the drawings, these ridges are also preferably slit longitudinally of the belt to enhance its ability to envelop the irregular surface and upwardly projecting pins of the pallets to be elevated thereby and gripped between adjacent runs of the belts 104 and 102. Pulleys 118, 120 supporting the belt 104 are respectively carried by shafts 122, 124 journaled in brackets 126, 128 secured to the side bars 114, 114. For yieldingly supporting the feed roll 106, which also is preferably resilient and serrated and slit like the belt 104, a shaft 129 carrying the roll has its ends journaled in the corresponding lower portions of a pair of arms 130 pivoted at their upper ends on the shaft 124. Stop screws 132 (Figs. 1 and 7) adjustably threaded into brackets 134 affixed on each bar 114 are arranged to be engaged by the arms 130, respectively, and thus serve to determine the normal or lower position of the roll. For raising each returning pallet so that at least a portion of its upper surface is progressively engaged by the feed roll a stationary, smooth, upturned lifter plate 136 (Figs. 7 and 8) arcuately spans the obtuse angle formed by the upper reaches of the belts 72, 102, and is progressively engaged by the leading lower edge of the pallet, as indicated in Fig. 8. In extending upwardly from between the belts 72 to between the belts 102 the curvature of the plate 136 preferably decreases. Triangular side guides 138 secured to the bars 114 assure that the pallet about to be elevated will be alined appropriately with the belts 102, 104.

While a single power source could be utilized for driving the main and auxiliary conveyor means described, it is preferred to drive the auxiliary or return loading mechanism by a separate motor 140 (Fig. 1) controlled by a pushbutton switch 141. This motor is mounted on a shelf 142 supported by the side bars 114 and has a V-belt driving connection with a pulley 144 secured on the shaft 112 to operate the elevator belts 102. The belt 104 is driven by means of a belt 146 connecting the pulley 144 with a pulley 148 on one end of the shaft 122. For operating the floor conveyor belts 72 an endless chain 150 (Figs. 1, 7, 8, and 9) is in mesh with a sprocket 152 (Fig. 11) fixed on the shaft 112 and is in mesh with a sprocket 154 (Fig. 10) fixed on the shaft 78. The feed roll 106 is driven by an endless chain 156 (Fig. 7) passing over sprockets 158, 160 (Fig. 7) secured respectively on adjacent ends of the shafts 124, 129.

Upon being elevated to the upper portion of the belt 102 and after a pallet has passed from the gripping influence of the belt 104, the upper end of the pallet engages a stationary deflector blade 162 (Fig. 9) adjustably secured between the side bars 114, a sleeve formed on the blade receiving a rod 164 which extends through parallel slots 166 formed in the bars 114, respectively. A nut and washer on each end of the rod 164 serve to hold the blade 162 in appropriate position for different lengths and shapes of pallets or other articles. From the upper end of the blade a flexible piece of sheet material 170, such as plastic, cloth, or other fabric, is suspended in V-shaped arrangement, a rod serving as a weight 172 being secured to the lower end of the material normally to hold it in straightened condition. As indicated in Fig. 9, the ascending pallet commences to tilt about the upper portions, respectively, of the peripheries of a pair of rolls 171, 171 (Figs. 9 and 11), preferably of wood, secured on the shaft 112, said rolls being arranged to engage side margins of the pallet and having radii slightly larger than the turning radii of the belts 102 on the pulleys 110. The upper end of the pallet engages the underside of the blade 162 and is then deflected downward against the material 170, tending to fold it while causing the lower end of the pallet to be swung on the rolls 171 away from the belt 102 and over the upper end of a chute 174. The weight 172 yieldingly moves upward as a result of the rebound blow of the pallet on the flexible material, and the consequent drop of the weight thereupon tends to restraighten the material, the pallet thereby receiving a thrust away from the belt 102 and farther over and into the chute 174. The wooden rolls 171 serve as fulcra but do not impede the downward movement of the pallets under the influence of gravity because of their negligible friction with the pallets. The chute 174 is inclined and mounted to conduct the falling pallet onto the loading station of the main conveyor.

In the illustrative arrangement the pallet recirculating system is automatically controlled by electrical means now to be explained and shown in Figs. 1 and 12, the diagram of Fig. 12 relating to a portion of the electrical system of a main conveyor system of the type herein under discussion and as disclosed, for example, in a copending application, Serial No. 545,765, filed November 8, 1955, in the names of Harold W. Bishop and Basil A. Strout (now Patent No. 2,877,541, granted March 17, 1959). Upon closure of a starting switch 176 a coil 178 is energized to close contacts 180, 182, and a motor M (Fig. 12) is caused to drive the main belts 20, 20 when a line switch 184 is closed. In the same manner as fully disclosed in said Bishop et al. application, the pallets 22 act upon arrival at each station, including the loading or metering station A, to open and close certain clamp-initiating switch contacts of the several pallet-lock-up and control mechanisms 24. Thus, referring to Fig. 12, a pallet arriving in station A opens a contact 186 and closes a contact 188, while at two operating stations, for example, other pallets are opening contacts 190, 194 and closing contacts 192, 196. For present purposes it will suffice to state that as a consequence of pallet actuation of the contacts of all of the mechanisms 24 a contact 198 is closed to energize a clamp solenoid valve 200 which operates arms (not shown but corresponding to the arm designated 212 in the cited patent to Dorosz et al.) at the several stations to position and clamp each pallet until the machines, if any, at said stations have operated, whereupon the pallets are returned to the belts 20, 20. In the preferred practice and arrangement herein shown, when one pallet is positioned in the metering station A, a second pallet next to enter station A is on the belts 20, 20 in endwise engagement with the just mentioned pallet, and the trigger 23 of this second pallet is just short of engaging a pivotally biased switch 202 which is normally held open. When the advance pallet 22 is metered out of station A, the belts 20 are effective to carry this second pallet into lock-up position in station A, the trigger projection 23 of the second pallet thus momentarily displacing the switch 202 to close it for an instant. As a result, a solenoid 204 (Figs. 1 and 12) is energized momentarily to raise its abovementioned, downwardly biased plunger 100 (Fig. 1) from the path of the trigger 23 of the leading pallet on the belts 72. This pallet thereupon escapes to be hoisted by the elevating mechanism 98, guided by the chute 174, and deposited on the belts 20, 20 where it is carried proximately to the switch 202 as a replacement for said second pallet which became clamped. Having allowed a single replacement pallet to escape for reloading, the plunger 100 is permitted by the switch 204 immediately to resume a stop position in engagement with the trigger 23 of the next leading pallet on the belts 72.

The operation, simplicity, and advantages of the pallet recirculating system will be clear from the foregoing description, and it will be apparent that many modifications may be made within the scope of this invention to adapt the apparatus in part or as a whole for conveniently recycling various articles or work holders. It will accordingly be understood that in appropriate situations the loading system may or may not include one or both of the knock-off or transfer mechanisms, and need not necessarily be used for depositing work in a zone through which it has previously passed.

Having thus described our invention, what we claim as new and desire to secure by Letters Patent of the United States is:

1. In a conveyor system comprising an inclined endless belt for elevating successive non-flexible articles, the upper end of the article-carrying surface of said belt having a certain turning radius as it travels over a supporting pulley, means disposed adjacent to said upper end to receive the articles after they have been elevated, a pair of spaced rolls mounted coaxially with and adjacent to said pulley and having a radius slightly larger than said turning radius, said rolls being adapted to provide less friction with the articles than said belt, and V-shaped abutment means mounted to be engaged by each article being elevated to reverse and pivot it on said rolls whereby it may slide downward into said receiving means.

2. A machine for loading successive, generally flat and substantially non-flexible articles onto a receiving station comprising hoisting mechanism for elevating the articles right side up successively, a chute having its mouth adjacent to the upper end of the hoisting mechanism and disposed to guide the elevated articles to the station, a sheet of flexible material vertically suspended adjacent to the upper end of said mechanism, and means mounted above the mouth of said chute to be engaged by each article fed from the mechanism for deflecting the article against said sheet material whereby, upon rebound therefrom, the direction of the article is reversed and directed right side up into the mouth of the chute.

References Cited in the file of this patent
UNITED STATES PATENTS

| | | |
|---|---|---|
| 2,636,591 | Galper | Apr. 28, 1953 |
| 2,711,616 | Weller | June 28, 1955 |